July 2, 1963     J. P. TESAR ETAL     3,095,915
APPARATUS FOR CONSTRUCTING CABINETS AND THE LIKE
Filed May 5, 1960     2 Sheets-Sheet 1
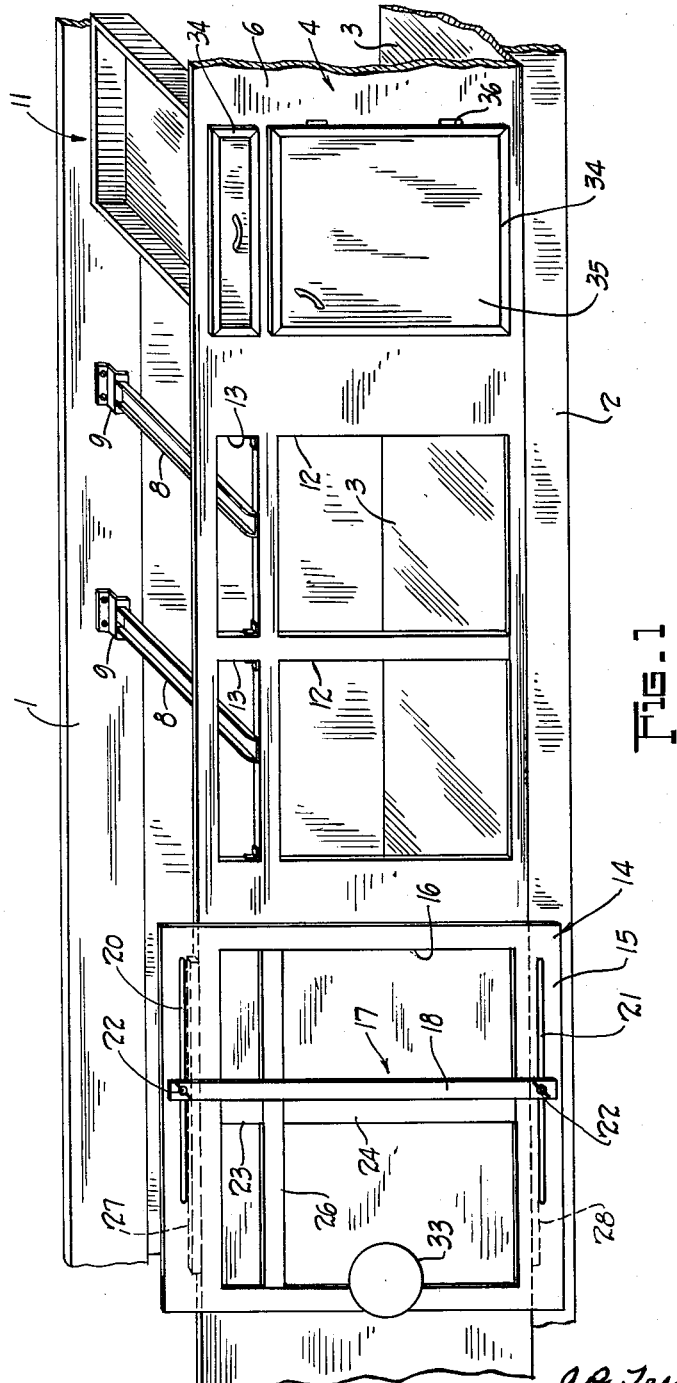
INVENTORS July 2, 1963   J. P. TESAR ETAL   3,095,915
APPARATUS FOR CONSTRUCTING CABINETS AND THE LIKE
Filed May 5, 1960   2 Sheets-Sheet 2
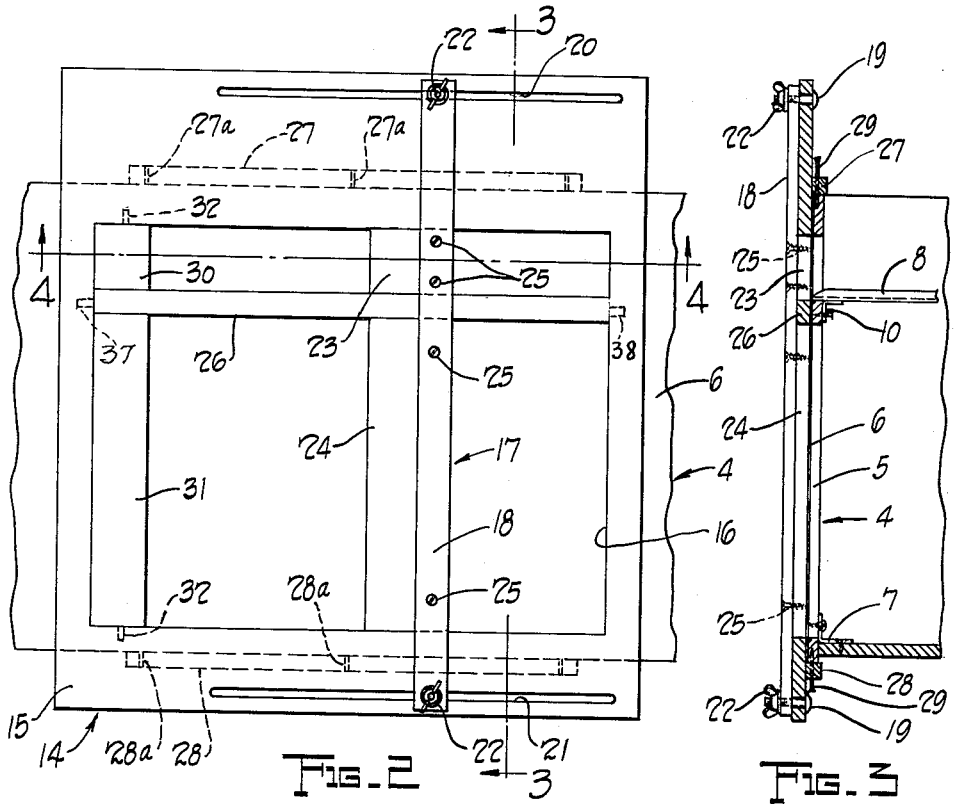
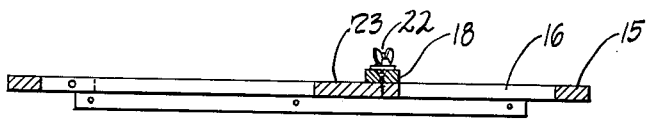
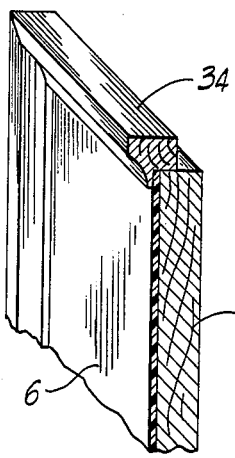
INVENTOR.
J. P. Tesar & S. J. Kot
BY Robb & Robb
Attorneys.

3,095,915
APPARATUS FOR CONSTRUCTING CABINETS AND THE LIKE
James P. Tesar, 870 Mulberry Road, and Stanley J. Kot, 12214 St. Clair Ave., both of Cleveland, Ohio
Filed May 5, 1960, Ser. No. 27,019
7 Claims. (Cl. 144—144.5)

This invention relates to novel apparatus for constructing cabinets and the like utilizing facings of pressure laminated plastic of the type of those sold under the trade names "Formica" and "Micarta."

Plastic laminates of the type referred to are commonly cemented to a suitable backing member usually of plywood to provide an outer finish or facing therefor. The manner of constructing cabinets and the like using such plastic laminate faced material, as heretofore practiced, involved the preliminary cutting of such material into strips or pieces of suitable sizes as necessary for framing door and drawer openings and then assembling the precut strips or pieces in conventional manner to form the cabinet construction. In that type of construction it will be obvious that a considerable amount of time will necessarily be spent in sanding or buffing or otherwise treating the edges of the material so as to enable the strips or pieces to fit together properly in abutting relation. At best of course, there will be noticeable lines of separation between the pieces or strips where they fit togther and in many instances it will not be possible to accomplish desired pattern matching of the abutting strips or pieces. Such unmatching serves undesirably to emphasize the separation lines between strips or pieces of the material where they fit together.

It is a principal object of the present invention to provide apparatus for such construction which overcomes the aforementioned disadvantages of previous construction and enables the work to be completed more rapidly and efficiently and with substantial savings in costs.

A specific object of the invention is to provide apparatus for construction which eliminates the necessity for cutting and fitting pieces of material to frame openings in the cabinet or other work.

Another specific object of the invention is to provide novel apparatus for construction which enables the construction material to be preliminarily assembled and the openings therein to be formed after such assembly.

In carrying our invention into practice we provide novel apparatus in the form of a jig which is quickly detachably securable to a preassembled panel of the construction material, said jig serving as a guide for a router or other suitable cutting tool for the cutting of openings in such panel, and said jig being provided with with adjustable means enabling accommodation of desired variations in size and locations of openings to be cut in such panel.

The invention further contemplates the utilization of the portions or pieces cut out from such panels to provide closure means for the openings formed therein in a manner which enables accurate color and pattern matching of the closure means with the adjacent portions of the panel.

The invention further contemplates the preliminary erection or assembly of the backing panels to form the cabinet or like construction and then, after such assembly is completed, the plastic laminate facing is cemented to the exterior exposed surfaces of the backing panels forming such cabinet or like construction, and finally, after said facing is so cemented, the door or drawer or like openings are cut through the plastic laminate faced panels forming such cabinet or like construction.

Other objects advantages and features of the invention will become apparent from the following detailed description of the invention, taken in conjunction with the accompanying drawings, in which:

FIGURE 1 is a perspective view of a cabinet installation, portions being broken away, illustrating various stages of the construction thereof, and showing the apparatus of my invention in operative position on a construction panel;

FIGURE 2 is an elevational view, on a somewhat enlarged scale, showing the apparatus of my invention mounted on a construction panel in such operative relation thereto;

FIGURE 3 is a sectional view taken on the line 3—3 of FIGURE 2;

FIGURE 4 is a sectional view taken on the line 4—4 of FIGURE 2; and

FIGURE 5 is detailed perspective view, partly in section, illustrating the manner of forming a door or other closure in accordance with the invention.

Now referring to the drawings and describing the invention in detail, FIGURE 1 illustrates a typical kitchen cabinet installation which is built up from the floor of the room in conjunction with an adjacent wall to which the nailing strip or frame member 1 is secured, said installation being designed to include a conventional counter top not shown. The installation includes an inset toe board 2 spaced from the wall of the room and suitably secured to the floor thereof upon which is supported the outer portion of the bottom wall or floor 3 of the cabinet. The outer wall 4 of the cabinet comprises a plastic laminate faced panel 4 consisting of a backing panel or layer 5 (FIGURE 5) which is usually plywood or like material and an outer plastic laminate facing 6 which can be of material such as those commonly sold under the trade names such as "Formica" or "Micarta." The plastic laminate facing 6 is cemented or otherwise suitably bonder to the backing panel 5.

The panel 4 is suitably secured to the base or bottom wall 3 of the cabinet as by means of angle brackets 7 (FIGURE 3) screwed to the base 3 and to the backing panel 5. The panel 4 is braced or rigidified in vertical position by means of any suitable bracing secured to and extending between the nailing strip 1 and the panel 4 and such bracing may comprise or include the metal drawer tracks or guides 8 provided at one end with brackets 9 secured to the nailing strip 1 and provided at opposite ends with other brackets 10 secured to the backing member or panel 5. The tracks 8 are designed to cooperate with other track or guide devices (not shown) secured to the bottoms of the drawers such as 11.

In accordance with our invention, it will be understood that the cabinet or like construction may either be erected in place in the manner shown or it may be preliminarily assembled complete with front, side and back walls and then put in place where it is to be used. In either event, the invention contemplates the preliminary erection or assembly of the backing panels 5 to form the cabinet or like construction, and then after such assembly is completed, the plastic laminate facing 6 is cemented to the exterior exposed surfaces of the backing panels 5 forming such cabinet or like construction. Finally, after the facing 6 is so cemented, the door openings such as 12 and the drawer openings such as 13, are formed by cutting through the plastic laminate faced panels 4. For the purpose of forming the door and drawer openings 12 and 13, our invention contemplates the provision of apparatus comprising the jig generally designated by the numeral 14 comprising a frame 15 made of wood or metal or any suitable material having an opening 16 therethrough of a size to encompass and outline a plurality of door openings and/or drawer openings to be cut through the panel 4. The jig 14 further includes an adjustable template or gage device generally indicated by the numeral 17, the latter including an arm 18 arranged to extend across the opening 15 and to engage the outer face of the jig frame 15. The arm 18 is secured to the jig frame 16 by means of bolts 19 (FIGURE 3) respectively extending through the elongated slots 20 and 21 provided in the frame 15, said bolts being provided with wing nuts 22 which when tightened will serve to secure the template 17 in fixed position relative to the jig frame 16. It will be apparent that the template 17 can be adjusted to different positions relative to the jig frame 15 by loosening the wing nuts 22 so that the bolts 19 will slide in the slots 20 and 21.

The template 17 further includes the gage blocks 23 and 24 which are secured to the inner face of the arm 18 by means of bolts 25, said gage blocks being of the same thickness as the jig frame 15 so that the inner and outer faces of the blocks 23 and 24 are flush with the inner and outer faces respectively of the jig frame 15 so that the gage blocks 23 and 24 are arranged to be disposed within the opening 16 within the common plane of the jig frame 15.

A gage member 26 is employed in conjunction with the template 17 and, as illustrated, is of a length to extend across the opening 16 and of the same thickness as the gage blocks 23 and 24 being adapted to be disposed in the opening 16 within the plane of the frame 15 between the gage blocks 23 and 24 which are engageable with the gage member 26 in the various positions to which the template 17 may be adjusted relative to the frame 15.

Means for detachably securing the jig 14 in position on the panel 4 include the mounting members 27 and 28 which are secured to and extend inwardly from the inner surface of the jig frame 15, the mounting members 27 and 28 being spaced apart at sufficient distance to encompass the panel 4 therebetween. Thus the jig may be mounted in position upon the panel 4 with the latter disposed between the mounting members 27 and 28 as best shown in FIGURE 3. Drilled passages 27a are provided extending vertically through the mounting member 27 and similar drilled passages 28a are provided extending vertically through the mounting member 28. For securing the jig in position on the panel 4, nails 29 or like members are inserted in the passages 27a and 28a and into the backing member 5 of the panel 4.

In the use of the jig 14, it may be found desirable to employ the detachable spacer blocks or members such as 30 and 31 (FIGURE 2) which are adapted to be disposed in the opening 16 within the plane of the frame member 15 in engagement with the gage member 26 in the same manner as the gage members 23 and 24, the members 30 and 31 serving to maintain alignment of the member 26. The members 30 and 31 may be provided with pins 32 insertable into drilled passages in the jig frame 15 for holding the members 30 and 31 in position.

In the use of the described apparatus, the template 17 will be adjusted realtive to the frame 15 so that the gage members 23, 26 and 30 in conjunction with the upper edge of the opening 16 will outline one of the drawer openings 13 to be cut in the panel 4 and, at such position of adjustment, the gage members 24, 26 and 31 in conjunction with the lower edge of opening 16, will outline the door opening 12 to be cut in the panel 4 immediately below the outlined drawer opening. A router such as indicated at 33 will then be used to cut through the panel 4 with the bit of the router tool working against the edges of the gage members 23, 24, 26, 30 and 31 and against the edges of the opening 16 outlining the drawer opening 12 and the door opening 13 to be cut through the panel 4.

After the material of the panel 4 is thus cut out to form one of the drawer openings 13 and the door opening 12 therebelow, with the jig 14 still retained in the same position on the panel 4, the template 17 may be readjusted relative to the jig frame 15 to outline an adjacent drawer opening 13 and an adjacent door opening 12, utilizing for this purpose the openings through the jig frame 15 partially defined by the right hand edges of the gage members 23 and 24, referring to FIGURE 2.

It will be understood that if the gage members 23 and 24 are of sufficient lateral widths to properly maintain alignment of the gage member 26, it may, under such conditions, not be necessary to employ the spacer gage members 30 and 31.

The portion of the panel 4 cut out to provide one of the door openings 12 may be used to provide a door for such opening by suitably securing to said cut out portion a trim molding 34 extending around the edges of the said cut out portion in the manner illustrated in FIGURE 5, said molding being rabbetted as there shown to partially overlie the palstic laminate facing 6 and the exposed edges of said cut out portion. The doors 35 so constructed may be hinged to the panel 4 by means of hinges 36 (FIGURE 1) suitably secured to the door and to the panel.

In a manner similar to that just described, the portions of the panel 4 cut out to provide the drawer openings 13 may be similarly provided with trim moldings 34 to provide outer closure facings for the drawers 11. It will be apparent from the foregoing that where the portions of the panel 4 cut out to provide the drawer openings 13 and door openings 12 are used in the manner indicated to provide closure facings for those same openings, the said closure facings will match the adjacent portions of the facing of the panel 4 in pattern and color.

The gage member 26 may be provided with a pin 37 (FIGURE 2) insertable into a drilled passage in the jig frame 15 and member 26 may also be provided with a spring biased detent 38 receivable in a drilled passage in the jig frame, for retaining member 26 in place on frame 16.

We claim:

1. In apparatus of the class described, in combination, a jig frame having an opening therethrough, an arm extending across one face of the frame and secured thereto for movement of said arm transversely of its length over said face to different fixed positions relative to the frame, and a gage member of approximately the same thickness as said frame and secured to said arm for movement therewith and to lie within the plane of said frame.

2. In apparatus of the class described, in combination, a jig frame having an opening therethrough, an arm extending across one face of said frame and secured thereto for movement of said arm transversely of its length over said face to different fixed positions relative to said frame, a gage member of approximately the same thickness as said frame secured to said arm for movement therewith and to lie within said opening in the plane of said frame, and a second gage member of approximately the same thickness as the frame and arranged within said opening in the plane of said frame and engageable with said first mentioned gage member in various positions of movement of said arm relative to said frame.

3. In apparatus of the class described, in combination, a jig frame having an opening therethrough, an arm extending across one face of said frame and secured thereto for movement of said arm transversely of its length over said face to different fixed positions relative to said frame, and a plurality of gage members of approximately the same thickness as said frame and secured to said arm for movement therewith and in spaced relation to one another to lie within said opening in the plane of said frame.

4. In apparatus of the class described, in combination, a jig frame having an opening therethrough, an arm extending across one face of said frame and secured thereto for movement of said arm transversely of its length over said face to different fixed positions relative to said frame, and a plurality of gage members of approximately the same thickness as said frame and secured to said arm for movement therewith and in spaced relation to one another to lie within said opening in the plane of said frame, and another gage member of approximately the same thickness as said frame and disposed within said opening within the plane of said frame for engagement with the previously mentioned gage members in different positions of movement of said arm relative to said frame.

5. Apparatus as claimed in claim 2, combined with a spacer member of the same thickness as said frame and arranged to lie within said opening in the plane of said frame and engageable with said frame and said second gage member to maintain alignment thereof.

6. Apparatus as claimed in claim 2, combined with a plurality of spacer members of approximately the same thickness as said frame and arranged to lie within said opening in the plane of said frame for engagement with said frame and with opposite side edges of said last mentioned gage member to maintain alignment thereof.

7. Apparatus as claimed in claim 1, combined with means for detachably securing said frame in face to face engagement with a construction panel.

References Cited in the file of this patent

UNITED STATES PATENTS

| | | |
|---|---|---|
| 1,115,995 | Willson | Nov. 3, 1914 |
| 1,770,925 | Howe | July 22, 1930 |
| 1,950,087 | Lind | Mar. 6, 1934 |
| 2,652,866 | Drain | Sept. 22, 1953 |
| 2,663,335 | Gohm | Dec. 22, 1953 |
| 2,679,696 | Reeder | June 1, 1954 |